(12) United States Patent
Bray

(10) Patent No.: US 11,576,456 B2
(45) Date of Patent: Feb. 14, 2023

(54) OPTICAL FILTER WITH STACKED LAYERS

(71) Applicant: BAE SYSTEMS plc, London (GB)

(72) Inventor: Mark Edgar Bray, Chelmsford (GB)

(73) Assignee: BAE SYSTEMS PLC, London (GB)

( * ) Notice: Subject to any disclaimer, the term of this patent is extended or adjusted under 35 U.S.C. 154(b) by 246 days.

(21) Appl. No.: 16/980,922

(22) PCT Filed: Mar. 6, 2019

(86) PCT No.: PCT/GB2019/050630
§ 371 (c)(1),
(2) Date: Sep. 15, 2020

(87) PCT Pub. No.: WO2019/175545
PCT Pub. Date: Sep. 19, 2019

(65) Prior Publication Data
US 2020/0405002 A1    Dec. 31, 2020

(30) Foreign Application Priority Data

Mar. 16, 2018    (EP) ..................................... 18275041
Mar. 16, 2018    (GB) ..................................... 1804203

(51) Int. Cl.
*G02B 5/20* (2006.01)
*A42B 3/22* (2006.01)
(Continued)

(52) U.S. Cl.
CPC .............. *A42B 3/226* (2013.01); *G02B 5/203* (2013.01); *G02B 5/26* (2013.01); *G02B 5/286* (2013.01)

(58) Field of Classification Search
CPC .......... G02B 5/203; G02B 5/26; G02B 5/286; G02B 5/20; G02B 5/208; G02B 5/32;
(Continued)

(56) References Cited

U.S. PATENT DOCUMENTS

| 4,637,678 A | 1/1987 | Moss et al. |
| 5,189,560 A | 2/1993 | Edwards et al. |

(Continued)

FOREIGN PATENT DOCUMENTS

| EP | 0583048 A1 | 4/1994 |
| EP | 3210579 A1 | 8/2017 |

(Continued)

OTHER PUBLICATIONS

International Search Report and Written Opinion received for PCT Application No. PCT/GB2019/050631. dated Apr. 24, 2019. 15 pages.

(Continued)

*Primary Examiner* — Arnel C Lavarias
(74) *Attorney, Agent, or Firm* — Finch & Maloney PLLC

(57) ABSTRACT

An optical filter includes a first layer including a first notch filter arranged to attenuate electromagnetic radiation having a first wavelength $\lambda_1$ incident normally thereupon. The optical filter includes a second layer including a second notch filter arranged to attenuate electromagnetic radiation having a second wavelength $\lambda_2$ incident normally thereupon. The first wavelength $\lambda_1$ and the second wavelength $\lambda_2$ are different. The second layer is stacked upon the first layer. In use, the first notch filter attenuates the electromagnetic radiation having a predetermined wavelength $\lambda$ incident thereupon at a first angle of incidence $\theta_1$ and the second notch filter attenuates the electromagnetic radiation having the predetermined wavelength $\lambda$ incident thereupon at a second angle of incidence $\theta_2$, wherein the first angle of incidence $\theta_1$ and the second angle of incidence $\theta_2$ are different.

19 Claims, 6 Drawing Sheets

(51) Int. Cl.
*G02B 5/26* (2006.01)
*G02B 5/28* (2006.01)

(58) Field of Classification Search
CPC ............... G02B 27/01; G02B 27/0101; G02B 27/0103; G02B 2027/0109; G02B 27/017; G02B 27/0172; G02B 2027/0174; A42B 3/226; A42B 3/227; G03H 1/00; G03H 1/0005; G03H 1/024; G03H 1/0248; G03H 1/0402; G03H 2001/0415; G03H 2001/043; G03H 2260/12; G03H 2260/00
USPC ... 359/359, 1, 3, 8, 13, 14, 15, 35, 601, 613
See application file for complete search history.

(56) References Cited

U.S. PATENT DOCUMENTS

| | | | |
|---|---|---|---|
| 5,745,292 | A | 4/1998 | Jones |
| 6,411,451 | B1 | 6/2002 | Fliss et al. |
| 8,228,591 | B1 | 7/2012 | Towers et al. |
| 2002/0159155 | A1 | 10/2002 | O'Brien |
| 2010/0110515 | A1 | 5/2010 | Blais-Ouellette et al. |
| 2015/0260887 | A1 | 9/2015 | Salisbury et al. |
| 2017/0242244 | A1 | 8/2017 | O'Connell et al. |

FOREIGN PATENT DOCUMENTS

| | | | |
|---|---|---|---|
| GB | 2548657 | A | 9/2017 |
| GB | 2548658 | A | 9/2017 |
| GB | 2552551 | A | 1/2018 |
| WO | 9723789 | | 7/1997 |
| WO | 0227287 | A1 | 4/2002 |
| WO | 2012177296 | A1 | 12/2012 |
| WO | 2016085767 | A1 | 6/2016 |
| WO | 2017163031 | A1 | 9/2017 |
| WO | 2017163058 | A1 | 9/2017 |
| WO | 2019175545 | A1 | 9/2019 |
| WO | 2019175546 | A1 | 9/2019 |

OTHER PUBLICATIONS

GB Search Report under Section 17(5) received for GB Application No. 1804202 8, dated Sep. 14, 2018. 4 pages.
Extended European Search Report received for EP Application No. 18275040.6, dated Oct. 18, 2018. 8 pages.
International Preliminary Report on Patentability received for PCT Application No. PCT/GB2019/050630. dated Oct. 1, 2020. 8 pages.
International Preliminary Report on Patentability received for PCT Application No. PCT/GB2019/050631. dated Oct. 1, 2020. 9 pages.
International Search Report and Written Opinion received for PCT Application No. PCT/GB2019/050630. dated Apr. 25, 2019. 14 pages.
GB Search Report under Section 17(5) received for GB Application No. 1804203.6, dated Sep. 3, 2018. 4 pages.
Extended European Search Report received for EP Application No. 18275041.4, dated Oct. 1, 2018. 8 pages.
Moser,C, and Havermeyer, F., "Ultra-narrow-band tunable laserline notch filter," Applied Physics B; Lasers and Optics, Springer, vol. 95, No. 3, Mar. 3, 2009, pp. 597-601.

OPTICAL FILTER WITH STACKED LAYERS

FIELD

The present invention relates to optical filters. Particularly, the present invention relates to optical filters arranged to attenuate electromagnetic radiation incident thereupon at normal and non-normal angles of incidence.

BACKGROUND TO THE INVENTION

Coherent electromagnetic radiation sources, for example laser lights or laser pointers, may be used maliciously to harm humans, for example pilots or drivers. The harm may include distraction, dazzle, flash blindness and/or physiological damage.

Conventional optical filters may be provided to attenuate, at least in part, such incident electromagnetic radiation (also known as hostile light) and thereby reduce the harm. A known optical filter provides narrow band notches which reflect the hostile light and allow the rest of the light to pass. This known optical filter has advantages of providing protection while allowing a high visible light transmission and minimal colouration of the light passing through. However, reflection of the hostile light is restricted to a cone of incidence (i.e. a range of angles of incidence), wherein the cone angle depends on a bandwidth of the notch. For example, a 10 nm bandwidth may be used to protect only from hostile light within a cone angle of approximately 30°. In addition, this known optical filter is suitable for use only where a viewing geometry between the optical filter and the viewer (i.e. the eyes thereof) is well controlled or constrained.

Hence, there is a need to improve protection from hostile light.

SUMMARY OF THE INVENTION

It is one aim of the present invention, amongst others, to provide an optical filter which at least partially obviates or mitigates at least some of the disadvantages of the prior art, whether identified herein or elsewhere. For instance, it is an aim of embodiments of the invention to provide an optical filter that provides protection from hostile light incident thereupon within a larger cone angle. For instance, it is an aim of embodiments of the invention to provide an optical filter that provides protection from hostile light incident thereupon wherein a viewing geometry is less constrained, for example when viewing through the optical filter at two different angles, such as with two eyes or by two different people, for example.

According to the first aspect, there is provided an optical filter for a visor, the optical filter comprising:

a first layer comprising a first notch filter arranged to attenuate electromagnetic radiation having a first wavelength, incident normally thereupon; and a second layer comprising a second notch filter arranged to attenuate electromagnetic radiation having a second wavelength incident normally thereupon, wherein the first wavelength and the second wavelength are different;

wherein the second layer is stacked upon the first layer; and whereby, in use, the first notch filter attenuates the electromagnetic radiation having a predetermined wavelength incident thereupon at a first angle of incidence and the second notch filter attenuates the electromagnetic radiation having the predetermined wavelength incident thereupon at a second angle of incidence, wherein the first angle of incidence and the second angle of incidence are different.

According to a second aspect, there is provided a visor or a windshield comprising the optical filter according to the first aspect.

According to a third aspect, there is provided a method of manufacturing a visor or a windshield according to the second aspect, the method comprising:

providing the first layer comprising the first notch filter arranged to attenuate electromagnetic radiation having the first wavelength;

providing the second layer comprising a second notch filter arranged to attenuate electromagnetic radiation having a second wavelength, wherein the first wavelength and the second wavelength are different;

stacking the second layer upon the first layer, thereby forming the optical filter; and applying the first layer to the visor or the windshield.

According to a fourth aspect, there is provided use of an optical filter to attenuate electromagnetic radiation having a predetermined wavelength incident thereupon at a first angle of incidence and at a second angle of incidence, wherein the first angle of incidence and the second angle of incidence are different, wherein the optical filter comprises:

a first layer comprising a first notch filter arranged to attenuate electromagnetic radiation having a first wavelength, incident normally thereupon; and a second layer comprising a second notch filter arranged to attenuate electromagnetic radiation having a second wavelength incident normally thereupon, wherein the first wavelength and the second wavelength are different; and wherein the second layer is stacked upon the first layer.

DETAILED DESCRIPTION OF THE INVENTION

According to the present invention there is provided, as set forth in the appended claims. Also provided is. Other features of the invention will be apparent from the dependent claims, and the description that follows.

Throughout this specification, the term "comprising" or "comprises" means including the component(s) specified but not to the exclusion of the presence of other components. The term "consisting essentially of" or "consists essentially of" means including the components specified but excluding other components except for materials present as impurities, unavoidable materials present as a result of processes used to provide the components, and components added for a purpose other than achieving the technical effect of the invention, such as colourants, and the like.

The term "consisting of" or "consists of" means including the components specified but excluding other components.

Whenever appropriate, depending upon the context, the use of the term "comprises" or "comprising" may also be taken to include the meaning "consists essentially of" or "consisting essentially of", and also may also be taken to include the meaning "consists of" or "consisting of".

The optional features set out herein may be used either individually or in combination with each other where appropriate and particularly in the combinations as set out in the accompanying claims. The optional features for each aspect or exemplary embodiment of the invention, as set out herein are also applicable to all other aspects or exemplary embodiments of the invention, where appropriate. In other words, the skilled person reading this specification should consider the optional features for each aspect or exemplary embodiment of the invention as interchangeable and combinable between different aspects and exemplary embodiments.

According to the first aspect, there is provided an optical filter for a visor, the optical filter comprising:

a first layer comprising a first notch filter arranged to attenuate electromagnetic radiation having a first wavelength, incident normally thereupon; and a second layer comprising a second notch filter arranged to attenuate electromagnetic radiation having a second wavelength incident normally thereupon, wherein the first wavelength and the second wavelength are different;

wherein the second layer is stacked upon the first layer; and whereby, in use, the first notch filter attenuates the electromagnetic radiation having a predetermined wavelength incident thereupon at a first angle of incidence and the second notch filter attenuates the electromagnetic radiation having the predetermined wavelength incident thereupon at a second angle of incidence, wherein the first angle of incidence and the second angle of incidence are different.

In this way, the optical filter provides protection from the electromagnetic radiation having the predetermined wavelength incident thereupon (i.e. hostile light) at the first angle of incidence and the second angle of incidence (i.e. within a larger cone angle) since the first notch filter and the second notch filter attenuate the electromagnetic radiation having the predetermined wavelength incident thereupon at different first and second angles of incidence, respectively. In this way, the optical filter provides protection from the electromagnetic radiation having the predetermined wavelength incident thereupon (i.e. hostile light) wherein a viewing geometry is less constrained since the larger cone angle, as described above, permits relative movement of a user and/or the user's eyes and the optical filter.

The inventors have found that for conventional optical filters, reflection of light is restricted to a cone, the angle of which depends on the bandwidth of the notch. For example a 10 nm bandwidth can be used to protect for light incident of the filter at angles to either side of the normal of approximately 15 degrees. As the light moves away from the normal, the filter function moves to lower wavelengths (towards the blue end of the spectrum).

The inventors have found that a relatively simple approach to deal with this restricted cone, by to broadening the bandwidth of the notch, is not preferable as visible light transmission will reduce significantly as a relation between the bandwidth of the notch and the cone angle is superlinear. For example, to increase the cone angle to +/−45°, the bandwidth of the notch required to protect against 532 nm narrow band radiation with a filter having an effective refractive index of 1.5, is approximately 63 nm. Furthermore, such a broader bandwidth of the notch may also increase colouration of the light observed by the user. It should be understood that the cone angle is the total range of angle of incidence. Thus, an angle of incidence at 15° to the normal thus describes a cone angle of 30°, for example.

In contrast, the optical filter according to the first aspect stacks the first and second layers comprising the first notch filter and the second notch filter respectively, so that each notch filter protects a user from light passing through that portion of the respective notch filter at an angle to reach the user and/or users. In other words, by stacking two or more notch filters having different nominal centre wavelengths, protection for two or more observation angles is provided by the optical filter. This provides a benefit over broadening a single filter, as described below. Furthermore, by stacking two or more notch filters, binary (i.e. two eyes and/or two individuals) protection against multiple wavelengths may be achieved. For example, if the portion is provided on a visor which is directly in front of one eye, the first notch filter may be arranged so that respective first wavelength is close to a predetermined wavelength of a hostile light, for example a laser pointer. This provides enhanced protection as the viewing angle changes away from normal and the filter blue shifts (i.e. shifts towards shorter wavelengths due to the change in viewing angle, as described below). In contrast, the second notch filter may be red shifted with respect to the first notch filter so that the predetermined wavelength is within the blocking range at the angle to the second eye, thereby protecting from the hostile light. In this way, both eyes are then protected simultaneously from the hostile light.

That is, the optical filter according to the first aspect is an improvement over simply broadening a conventional single optical filter, since at certain angles the two notch filters (i.e. the first notch filter and the second notch filter) providing the binary protection need not overlap in bandwidth. Therefore, less light is blocked, allowing a larger transmission of visible light and less colouration. It can be appreciated that a nominal bandwidth of a single notch filter may be 10 nm. Therefore, the maximum bandwidth for a binary filter may be 20 nm (at the symmetry point on the filter between the two observations the bandwidth is 10 nm).

For example, for electromagnetic radiation having the first wavelength of 532 nm, a 10 nm notch filter has a cone angle of approximately ±15° while a 20 nm notch filter has a cone angle of approximately ±25°. The first notch filter and the second notch filter together provide respective cone angles in which incident electromagnetic radiation having the predetermined wavelength is attenuated, and thus each pupil may receive electromagnetic radiation attenuated respectively by the first notch filter and the second notch filter. The respective cone angles need not overlap and may be associated with each pupil or viewer.

The notch wavelengths can be varied so that binary protection can be achieved as the angle of the filter to the first eye is varied, giving protection over the field of view, despite the red shift which is mitigated by the first notch filter and the second notch filter.

A geometry for red shift of filter calculations is described below with reference to FIG. 1 and is generally applicable to the optical filter i.e. not limited to the exemplary embodiment of FIG. 1.

This optical filter could also be used for other applications such as 3D visors e.g. used in reflection for augmented reality where the filter reflects the desired light towards the pupils. Use with red, green and blue stacked wavelengths with this approach could provide colour 3D vision.

In one example, the first notch filter is arranged to attenuate electromagnetic radiation having a first wavelength range including the first wavelength; and the second notch filter is arranged to attenuate electromagnetic radiation having a second wavelength range including the second wavelength;

whereby, in use, the first notch filter attenuates the electromagnetic radiation having the predetermined wavelength incident thereupon at a first angle of incidence range including the first angle of incidence and the second notch filter attenuates the electromagnetic radiation having the predetermined wavelength incident thereupon at a second angle of incidence range including the second angle of incidence.

That is, the first notch filter reduces transmission therethrough of electromagnetic radiation having a range of wavelengths including the first wavelength, for example a bandwidth around and/or including the first wavelength and the second notch filter reduces transmission therethrough of electromagnetic radiation having a range of wavelengths including the second wavelength, for example a bandwidth around and/or including the second wavelength.

In one example, the first wavelength range and the second wavelength range overlap, at least in part. In this way, protection may be provided continuously across range of viewing angles.

In one example, the first angle of incidence range and the second angle of incidence range overlap, at least in part.

In one example, the first wavelength range is at most 30 nm, preferably at most 20 nm, more preferably at most 10 nm.

In one example, the second wavelength range is at most 30 nm, preferably at most 20 nm, more preferably at most 10 nm.

In one example, the first notch filter has a bandwidth in a range from 1 nm to 50 nm, preferably in a range from 2 nm to 20 nm, more preferably in a range from 5 nm to 10 nm.

In one example, the second notch filter has a bandwidth in a range from 1 nm to 50 nm, preferably in a range from 2 nm to 20 nm, more preferably in a range from 5 nm to 10 nm.

In one example, the first layer comprises a first set of first notch filters, including the first notch filter, arranged to attenuate electromagnetic radiation having respective first wavelengths, including the first wavelength.

In one example, the second layer comprises a second set of second notch filters, including the second notch filter, arranged to attenuate electromagnetic radiation having respective second wavelengths, including the second wavelength. In this way, protection may be provided from electromagnetic radiation having multiple first wavelengths, for example from laser pointers having first wavelengths of 445 nm, 532 nm or 650 nm.

In one example, the first wavelength is in a range from 100 nm to 1100 nm, preferably in a range from 380 nm to 760 nm for example 445 nm, 532 nm or 650 nm (i.e. visible light) and/or in a range from 760 nm to 1100 nm (i.e. infra red).

In one example, the second wavelength is in a range from 100 nm to 1100 nm, preferably in a range from 380 nm to 760 nm for example 445 nm, 532 nm or 650 nm (i.e. visible light) and/or in a range from 760 nm to 1100 nm (i.e. infra red).

In one example, the predetermined wavelength is in a range from 100 nm to 1000 nm, preferably in a range from 380 nm to 760 nm for example 445 nm, 532 nm or 650 nm (i.e. visible light) and/or in a range from 760 nm to 1100 nm (i.e. infra red). Typically, laser pointers used are sources of electromagnetic radiation having predetermined wavelengths of 445 nm, 532 nm or 650 nm, for example. Other laser pointers are known.

In one example, a difference between the second wavelength and the first wavelength is in a range from 0.1 nm to 150 nm, preferably in a range from 1 nm to 100 nm.

In one example, the first notch filter has a first optical density of at least 1, preferably at least 2, more preferably at least 3. That is, the first notch filter attenuates electromagnetic radiation having the first wavelength incident normally thereupon to at most 10%, at most 1% and at most 0.1% of the incident power, respectively.

In one example, the second notch filter has a second optical density of at least 1, preferably at least 2, more preferably at least 3. That is, the second notch filter attenuates electromagnetic radiation having the second wavelength incident normally thereupon to at most 10%, at most 1% and at most 0.1% of the incident power, respectively.

In one example, the second layer is stacked directly upon the first layer. That is, a surface of the second layer confronts and/or contacts an opposed surface of the first layer. In one example, the optical filter comprises an adhesive layer arranged between the first layer and the second layer to adhesively couple the first layer and the second layer. In one example, the adhesive layer is continuous. In one example, the adhesive layer is discontinuous. In one example, the adhesive layer is provided across at most 50%, at most 60%, at most 70%, at most 80%, at most 90% or at most 100% of the first layer and/or the second layer. In one example, the adhesive layer is provided across at least 40%, at least 50%, at least 60%, at least 70%, at least 80% or at least 90% of the first layer and/or the second layer.

In one example, the optical filter comprises and/or is a planar optical filter. In one example, the optical filter comprises and/or is a non-planar optical filter, for example a curved optical filter. In one example, the optical filter comprises and/or is a conformable optical filter. In this way, the optical filter may be conformed to a shape of a visor or a windscreen.

In one example, the optical filter comprises:

a third layer comprising a third notch filter arranged to attenuate electromagnetic radiation having a third wavelength incident normally thereupon, wherein the first wavelength, the second wavelength and the third wavelength are different;

wherein the third layer is stacked upon the second layer; and whereby, in use, the third notch filter attenuates the electromagnetic radiation having the predetermined wavelength incident thereupon at a third angle of incidence, wherein the first angle of incidence, the second angle of incidence and the third angle of incidence are different.

According to the second aspect, there is provided a visor or a windshield comprising the optical filter according to the first aspect.

According to the third aspect, there is provided a method of manufacturing a visor or a windshield according to the second aspect, the method comprising:

providing the first layer comprising the first notch filter arranged to attenuate electromagnetic radiation having the first wavelength;

providing the second layer comprising a second notch filter arranged to attenuate electromagnetic radiation having a second wavelength, wherein the first wavelength and the second wavelength are different;

stacking the second layer upon the first layer, thereby forming the optical filter; and applying the first layer to the visor or the windshield.

The method may include any of the steps described herein.

According to the fourth aspect, there is provided use of an optical filter to attenuate electromagnetic radiation having a first wavelength incident thereupon at a first angle of incidence and at a second angle of incidence, wherein the first angle of incidence and the second angle of incidence are different, wherein the optical filter comprises:

a first layer comprising a first notch filter arranged to attenuate electromagnetic radiation having a first wavelength, incident normally thereupon; and a second layer comprising a second notch filter arranged to attenuate electromagnetic radiation having a second wavelength incident normally thereupon, wherein the first wavelength and the second wavelength are different; and wherein the second layer is stacked upon the first layer.

The optical filter may be as described with respect to the first aspect.

BRIEF DESCRIPTION OF THE DRAWINGS

For a better understanding of the invention, and to show how exemplary embodiments of the same may be brought into effect, reference will be made, by way of example only, to the accompanying diagrammatic Figures, in which.

DETAILED DESCRIPTION OF THE DRAWINGS

Figure 1:
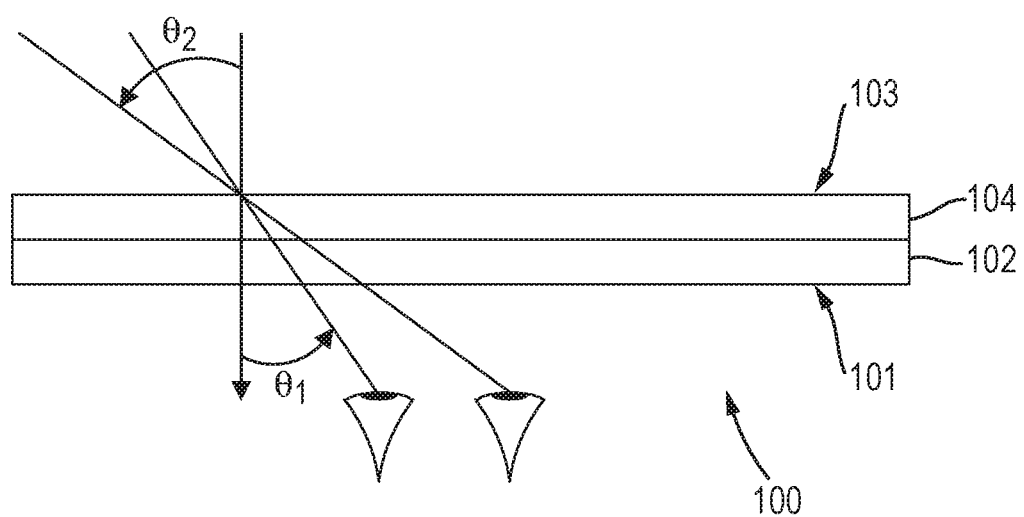
FIG. 1 schematically depicts an optical filter according to an exemplary embodiment.

FIG. 1 schematically depicts an optical filter 100 according to an exemplary embodiment.

Particularly, the optical filter 100 is for a visor. The optical filter 100 comprises a first layer 101 comprising a first notch filter 102 arranged to attenuate electromagnetic radiation having a first wavelength $\lambda_1$ incident normally thereupon. The optical filter 100 comprises a second layer 103 comprising a second notch filter 104 arranged to attenuate electromagnetic radiation having a second wavelength $\lambda_2$ incident normally thereupon. The first wavelength $\lambda_1$ and the second wavelength $\lambda_2$ are different. The second layer 103 is stacked upon the first layer 101. In use, the first notch filter 102 attenuates the electromagnetic radiation having the predetermined wavelength $\lambda$ incident thereupon at a first angle of incidence $\theta_1$ and the second notch filter attenuates the electromagnetic radiation having the predetermined wavelength $\lambda$ incident thereupon at a second angle of incidence $\theta_2$, wherein the first angle of incidence $\theta_1$ and the second angle of incidence $\theta_2$ are different.

In this way, the optical filter 100 provides protection from the electromagnetic radiation having the predetermined wavelength $\lambda$ incident thereupon (i.e. hostile light) at the first angle of incidence $\theta_1$ and the second angle of incidence $\theta_2$ (i.e. within a larger cone angle) since the first notch filter 102 and the second notch filter 104 attenuate the electromagnetic radiation having the predetermined wavelength $\lambda$ incident thereupon at different first and second angles of incidence, respectively. In this way, the optical filter 100 provides protection from the electromagnetic radiation having the predetermined wavelength $\lambda$ incident thereupon (i.e. hostile light) wherein a viewing geometry is less constrained since a larger effective cone angle is provided, thereby permitting relative movement of a user and the optical filter 100. The larger effective cone angle comprises two cone angles, one for each notch filter, having a common origin.

Geometry for Red Shift of Filter Calculations

It will be appreciated that $\theta_1$ and $\theta_2$ may vary. For example at the centre point of the two observers $\theta_1 = -\theta_2$; and when the light is normal to the filter for the first observer $\theta_1 = 0$.

Expressing the first oblique angle $\theta$ in radians, the wavelength of attenuation, for example blocking, is blue shifted according to Equation 1:

$$\lambda(\theta) = \lambda(0)\sqrt{1 - \left(\frac{\sin(\theta)}{n_{\mathit{eff}}}\right)^2}$$

where $n_{\mathit{eff}}$ is the effective refractive index and $\lambda(\theta)$ is the predetermined wavelength, incident normally to the first notch filter.

Therefore the nominal wavelength needs to be red shifted by a value $\lambda(0) - \lambda(\theta)$. This value may be different for the two notch filters providing binary protection.

Table 1 shows red shifts calculated from Equation 1 as a function of $\theta$ for $\lambda(0) = 532$ nm and $n_{\mathit{eff}} = 1.5$.

TABLE 1 red shifts calculated from Equation 1 as a function of $\theta$ for $\lambda(0) = 532$ nm and $n_{\mathit{eff}} = 1.5$.

| $\theta$ | Red shift (nm) |
| --- | --- |
| −80° | 130.7 |
| −70° | 117.3 |
| −60° | 97.6 |
| −50° | 74.6 |
| −40° | 51.3 |
| −30° | 30.4 |
| −20° | 14.0 |
| −10° | 3.6 |
| 0° | 0.0 |
| 10° | 3.6 |
| 20° | 14.0 |
| 30° | 30.4 |
| 40° | 51.3 |
| 50° | 74.6 |
| 60° | 97.6 |
| 70° | 117.3 |
| 80° | 130.7 |

Consider a flat visor, comprising the optical filter 100, positioned 10 cm in front of the two pupils (i.e. a first pupil and a second pupil), which are separated by 10 cm. At the region of the filter equidistant from the two pupils (i.e. the centre), the angle to both of the pupils is approximately 26.5° and the first notch filter 102 and the second notch filter 104 need to be red shifted by approximately 24 nm. However, if the region is normal to the first pupil, the angle to the second pupil is approximately 45° and the first notch filter 102 for the second pupil needs to be red shifted by approximately 63 nm while the second notch filter 104 for the first pupil is not red shifted. If the region is 10 cm to the left of the first pupil, the angle to this pupil is 45° degrees and the first notch filter 102 needs to be red shifted by approximately 60 nm while the angle to the second pupil is approximately 63.5° so the second notch filter 104 needs to be red shifted by approximately 105 nm. It should be understood that the first notch filter and the second notch filter 104 may be interchanged.

Figure 2:
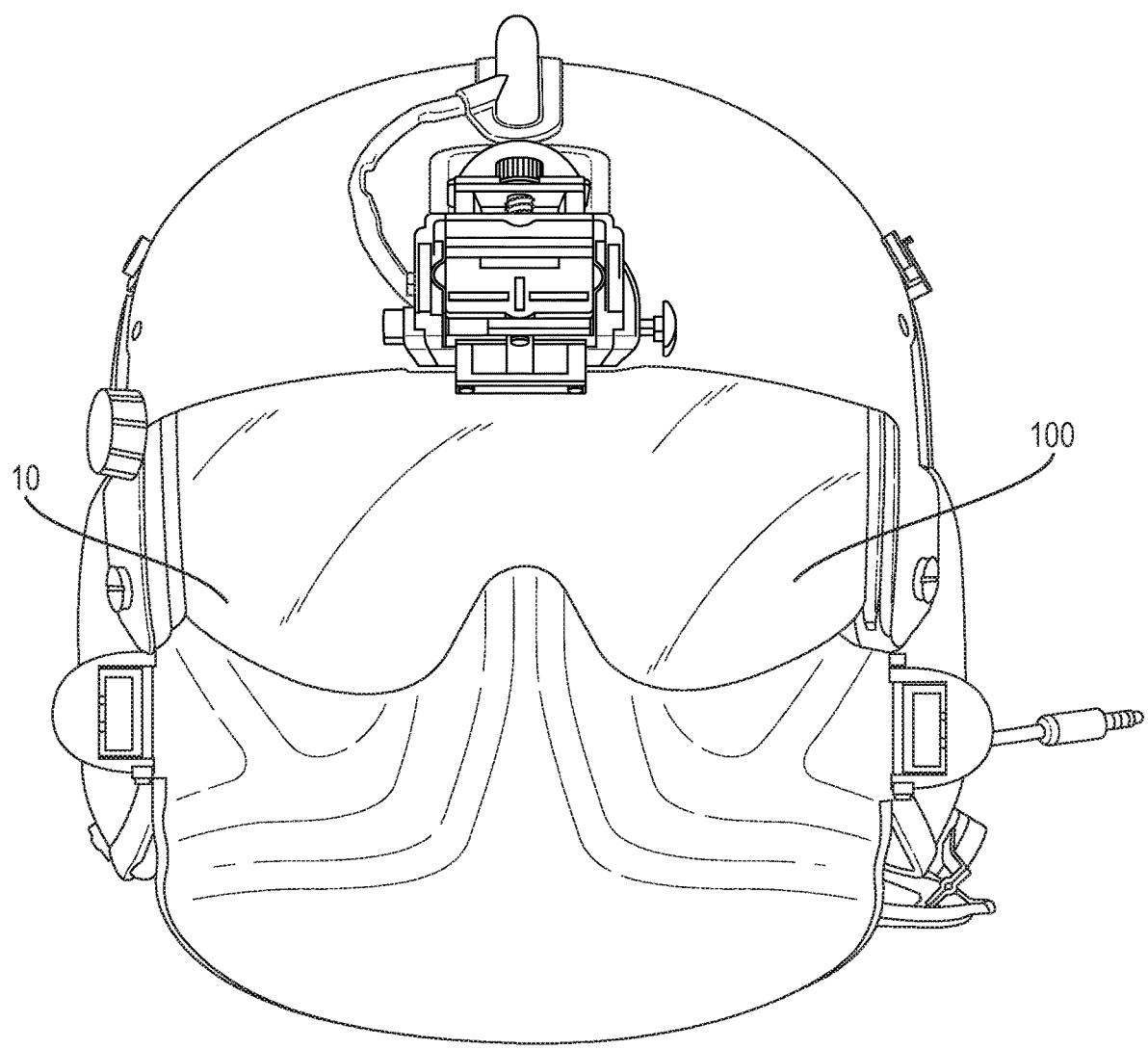
FIG. 2 schematically depicts a visor according to an exemplary embodiment.

FIG. 2 schematically depicts a visor 10 according to an exemplary embodiment.

Particularly, FIG. 2 shows a helmet having the visor 10, wherein the visor 10 comprises the optical filter 100, as described above with reference to FIG. 1, provided thereacross. In this way, binary (i.e. two eye) protection is better provided for a user of the helmet.

Figure 3:
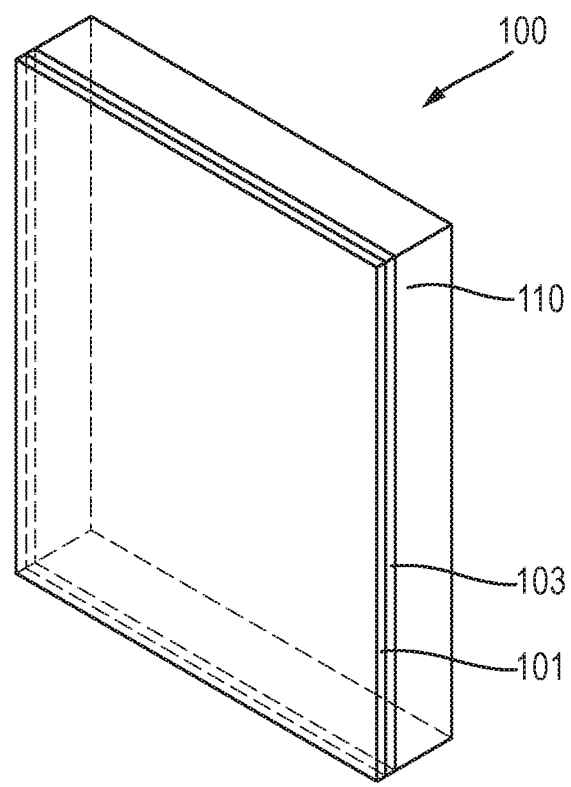
FIG. 3 schematically depicts an optical filter according to an exemplary embodiment.

FIG. 3 schematically depicts the optical filter 100 according to an exemplary embodiment.

The first notch filter 102 is provided as the layer 101 applied to a first face of a substrate 110 to provide at least a part of the optical filter 100 adapted for mitigating laser threats such as dazzle. The substrate 110 is substantially transmissive of visible light (for example it may have a visible light transmission (VLT %) of around 90% of normally incident light) and may be formed for example from a glass or a plastics material such as polycarbonate.

The first notch filter 101 is an interference filter formed by holographically exposing a photosensitive film with a plurality of lasers having a set of predetermined wavelengths within a selected wavelength band of bandwidth 10 nm or less.

Similarly, the second notch filter 104 is provided as the layer 103 applied to (i.e. stacked upon) the first layer 101 to provide the optical filter 100. Similarly, the second notch filter 103 is an interference filter formed as described above with respect to the first notch filter.

Conformable photosensitive (e.g. polymeric) films for use in exemplary embodiments of the present invention will be known to a person skilled in the art, and the present invention is not necessarily intended to be limited in this regard. Such photosensitive polymeric films are provided having varying degrees of inherent visible light transmission (VLT), ranging from less than 70% (and possibly, therefore, having a coloured tinge) up to 99% or more (and being substantially colourless and transparent). In respect of the present invention, suffice it to say that a photosensitive flexible/conformable (e.g. polymeric) film is selected having an inherent VLT of, for example, at least 85%. The film typically has a thickness of 1 to 100 micrometers. Thinner, currently known, films may not achieve useful optical densities. Indeed, in respect of currently known photosensitive polymeric films, the degree to which a selected radiation wavelength can be blocked (i.e. the effectiveness of a filter region formed therein) is determined by the thickness and refractive modulation index of the film and, also, by the optical design. Thus, the filter region thickness is ideally matched to the application and the potential power of the source from which protection is required (which may be dictated, at least to some extent, by the minimum distance from the target platform the laser threat may realistically be located and this, in turn, is dictated by application). In general, thicker films and films with higher refractive modulation indices would be selected if it were required to provide protection from higher power radiation sources or to provide greater angular coverage, but this might then have a detrimental effect on the inherent VLT of the film, so a balance is selected to meet the needs of a specific application. Two or more first notch filters 101 may be stacked to improve attenuation.

Thus, once the film has been selected, the required holographic exposure thereof is effected to form the filter regions of a required notch filter region to be provided thereon, as described below with reference to FIG. 4.

Figure 4:
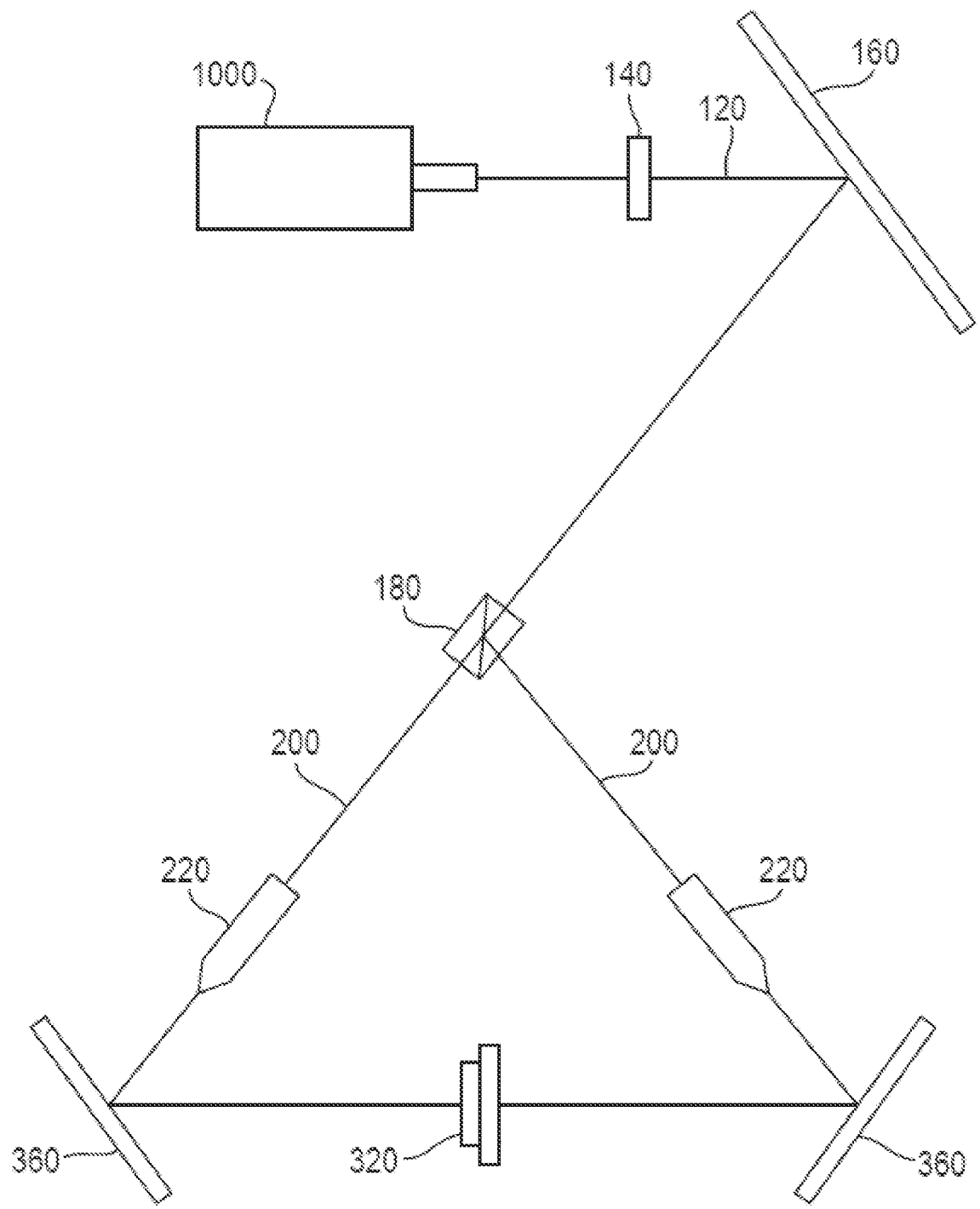
FIG. 4 schematically depicts a method of providing an optical filter according to an exemplary embodiment.

FIG. 4 schematically depicts a method of providing the optical filter 100 according to an exemplary embodiment.

The first notch filter 101 and the second notch filter 103 may be provided generally similarly, successively in separate holographic exposures or in the same holographic exposure.

Particularly, as shown in FIG. 4, distinct filter regions defining a notch filter region of a predetermined bandwidth (for example 5-10 nm) may be formed by exposing the film to the intersection of two counter propagating laser beams for each of a set of laser wavelengths within the selected wavelength band having a selected spectral bandwidth. Each laser 1000 (of a wavelength within the selected spectral bandwidth) produces a laser beam 120 which is controlled by a shutter 140. The laser beam 120 is directed by a mirror 160 into a beam splitter 180 wherein the beam is divided into equal beam segments 200. Each beam segment 200 passes through a microscope objective 220 and is then reflected by a respective mirror 360 onto the photosensitive polymer film 320. Other optical devices (not shown) may be provided between the microscope objective 220 and the mirror 360 to, for example, focus or diverge the respective beam segments 200, as required. Furthermore, masking or other limiting techniques may be utilised to limit the extent or thickness to which the film is exposed to the beam segments 200, as will be understood by a person skilled in the art. As a specific (non limiting) example, if it is required to provide a notch filter region of bandwidth 5 nm around 520 nm, then a plurality of lasers 1000 may be used to produce the notch filter region of (purely by way of example) 517.5 nm, 518 nm, 518.5 nm, 519 nm, 519.5 nm, 520 nm, 520.5 nm, 521 nm, 521.5 nm, 522 nm and 522.5 nm. The above-described exposure process may be performed consecutively for each of these laser wavelengths or, in other exemplary embodiments, the exposures may be performed substantially simultaneously. Other apparatus for forming a holographic filter region at each specified wavelength is known and could, alternatively, be used.

Once the exposure process has been completed, the resultant hologram can be fixed by, for example, a bleaching process.

Figure 5:
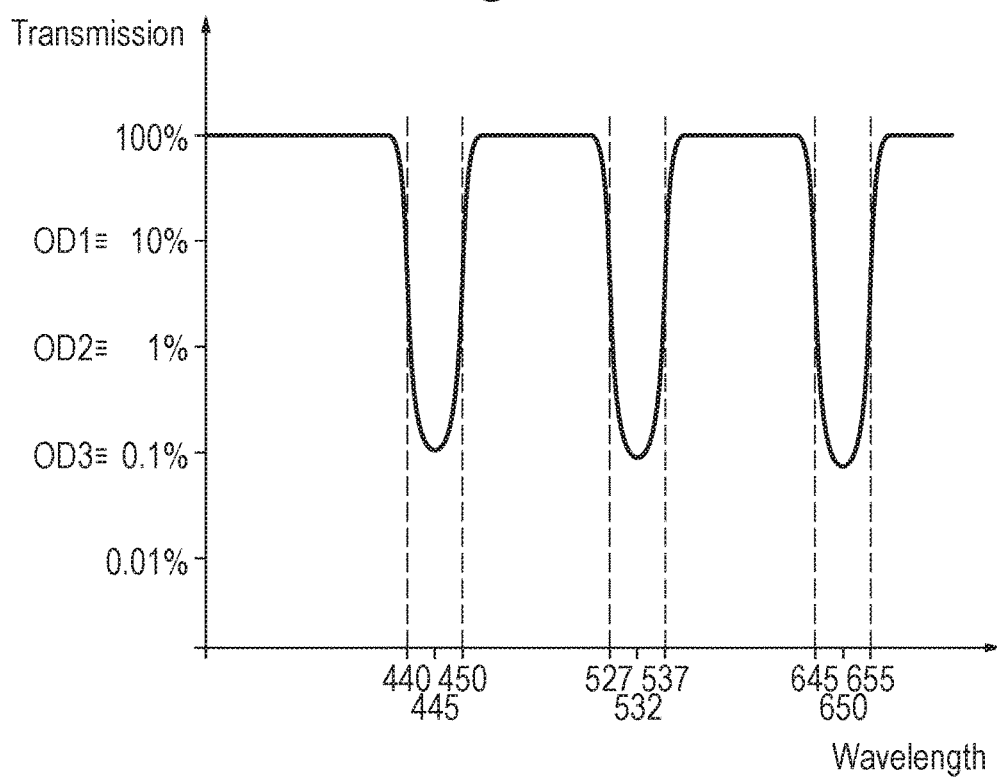
FIG. 5 schematically depicts transmission characteristics of an optical filter according to an exemplary embodiment.

FIG. 5 schematically depicts transmission characteristics of the optical filter 100 according to an exemplary embodiment.

Particularly, FIG. 5 shows the transmission characteristics (which may alternatively be referred to as the transfer function) of visible electromagnetic radiation incident on the first notch filter 101. The transmission intensity relative to incident radiation intensity is shown on the y-axis and the wavelength of the incident radiation is shown on the x-axis.

As can be seen on the plot, across the range of wavelengths the intensity of the transmitted radiation is close to 100% of that which is incident. In general, a VLT % of 90% would be acceptable if 100% were not feasible.

There are three distinct notches in the transmission characteristic associated with three wavelength bands. These are in particular a 10 nm band centred on 455 nm, a 10 nm band centred on 532 nm and a 10 nm band centred on 650 nm. In general any three notches from the group consisting of 405 nm, 455 nm, 520 nm, 532 nm, and 650 nm may be selected. Further, notches may be chosen to coincide with any expected laser threat wavelength. Still further, the bandwidth may be 5 nm.

At the centre of each of these bands, the intensity of the transmitted radiation is at a minimum and has an optical density of approximately 3, which is equivalent to 0.1% of the initially incident radiation.

Figure 6:
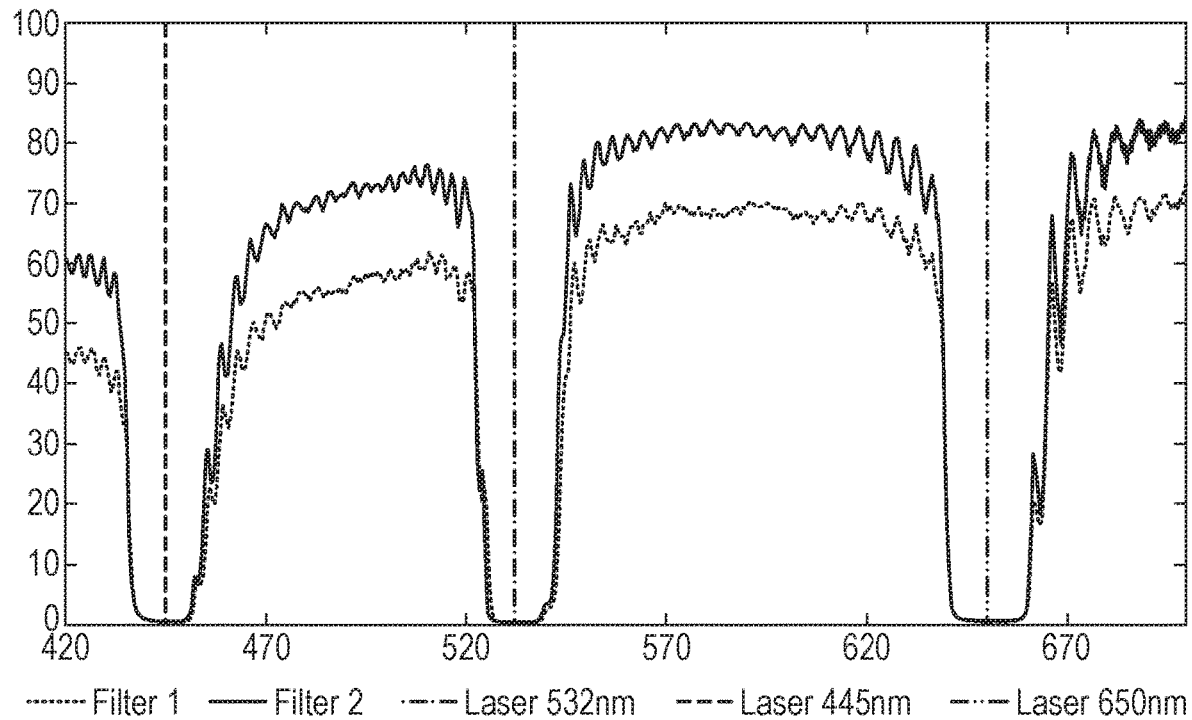
FIG. 6 schematically depicts transmission characteristics of an optical filter according to an exemplary embodiment.

FIG. 6 schematically depicts transmission characteristics of an optical filter according to an exemplary embodiment.

Particularly, FIG. 6 shows the measured transmission characteristics of visible electromagnetic radiation incident on the first notch filter 101. The transmission intensity relative to incident radiation intensity is shown on the y-axis and the wavelength of the incident radiation is shown on the x-axis, as described with reference to FIG. 5.

Figure 7:
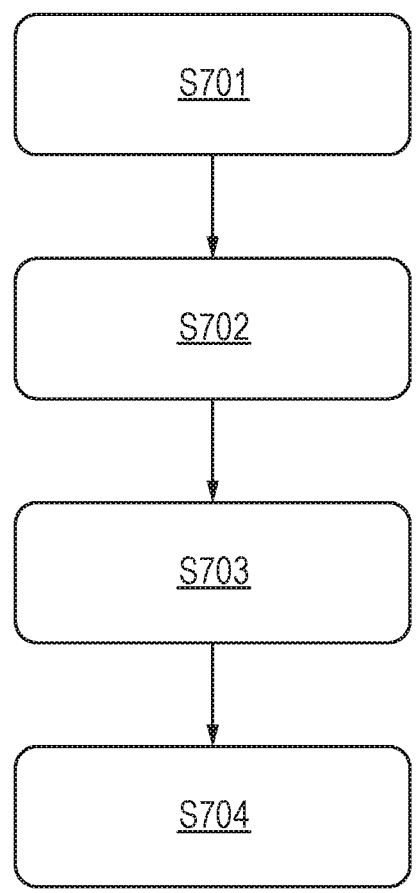
FIG. 7 schematically depicts a method of manufacturing according to an exemplary embodiment.

FIG. 7 schematically depicts a method of manufacturing according to an exemplary embodiment.

FIG. 7 schematically depicts a method of manufacturing the visor 10 or a windshield according to the second aspect.

At S701, the first layer 101, comprising the first notch filter 102 arranged to attenuate electromagnetic radiation having the first wavelength, is provided.

The first notch filter 102 may be provided as described with reference to FIGS. 3 and/or 4, for example.

At S702, the second layer 103, comprising the second notch filter 104 arranged to attenuate electromagnetic radiation having a second wavelength, is provided, wherein the first wavelength and the second wavelength are different.

The second notch filter 104 may be provided as described with reference to FIGS. 3 and/or 4, for example.

At S703, the second layer 103 is stacked upon the first layer 101, thereby forming the optical filter 100.

At S704, the first layer 101 is applied to the visor 10 or the windshield.

It should be understood that an order of the steps S701 to S704 may be varied. For example, the first layer 101 may be applied to the visor 10 or the windshield and subsequently, the second layer 103 may be stacked upon the first layer 101, thereby forming the optical filter 100 on the visor 10 or the windshield.

Although a preferred embodiment has been shown and described, it will be appreciated by those skilled in the art that various changes and modifications might be made without departing from the scope of the invention, as defined in the appended claims and as described above.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims and drawings), and/or all of the steps of any method or process so disclosed, may be combined in any combination, except combinations where at most some of such features and/or steps are mutually exclusive.

Each feature disclosed in this specification (including any accompanying claims, and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims and drawings), or to any novel one, or any novel combination, of the steps of any method or process so disclosed.

The invention claimed is:

1. An optical filter for a visor, the optical filter comprising:
    a first layer comprising a first notch filter arranged to attenuate electromagnetic radiation having a first wavelength, incident normally thereupon; and
    a second layer comprising a second notch filter arranged to attenuate electromagnetic radiation having a second wavelength, incident normally thereupon, wherein the first wavelength and the second wavelength are different;
    wherein the second layer is stacked above the first layer; and
    whereby, in use, the first notch filter attenuates electromagnetic radiation having a predetermined wavelength incident thereupon at a first cone angle of incidence, and the second notch filter attenuates the electromagnetic radiation having the predetermined wavelength incident thereupon at a second cone angle of incidence, wherein the first cone angle of incidence is within the second cone angle of incidence, and wherein the second cone angle of incidence is larger than the first cone angle of incidence.

2. The optical filter according to claim 1,
    wherein the first notch filter is arranged to attenuate electromagnetic radiation having a first wavelength range including the first wavelength; and
    wherein the second notch filter is arranged to attenuate electromagnetic radiation having a second wavelength range including the second wavelength;
    whereby, in use, the first notch filter attenuates the electromagnetic radiation having the predetermined wavelength incident thereupon at a first angle of incidence in the first cone angle of incidence, and the second notch filter attenuates the electromagnetic radiation having the predetermined wavelength incident thereupon at a second angle of incidence in the second cone angle of incidence.

3. The optical filter according to claim 2, wherein the first wavelength range and the second wavelength range each include the predetermined wavelength.

4. The optical filter according to claim 2, wherein the first wavelength range or the second wavelength range is at most 30 nm.

5. The optical filter according to claim 1, wherein the first layer comprises a first set of first notch filters, including the first notch filter, arranged to attenuate electromagnetic radiation having respective first wavelengths, including the first wavelength.

6. The optical filter according to claim 1, wherein the second layer comprises a second set of second notch filters, including the second notch filter, arranged to attenuate electromagnetic radiation having respective second wavelengths, including the second wavelength.

7. The optical filter according to claim 1, wherein the first wavelength, the second wavelength, or the predetermined wavelength is in a range from 100 nm to 1100 nm.

8. The optical filter according to claim 1, wherein a difference between the second wavelength and the first wavelength is in a range from 0.1 nm to 150 nm.

9. The optical filter according to claim 1, wherein the first notch filter has a first optical density of at least 2 or wherein the second notch filter has a second optical density of at least 2.

10. The optical filter according to claim 1, wherein the optical filter comprises a conformable optical filter.

11. The optical filter according to claim 1, wherein the second layer is stacked directly upon the first layer.

12. The optical filter according to claim 1, comprising:
    a third layer comprising a third notch filter arranged to attenuate electromagnetic radiation having a third wavelength, incident normally thereupon, wherein the first wavelength, the second wavelength and the third wavelength are different;
    wherein the third layer is stacked above the second layer; and
    whereby, in use, the third notch filter attenuates the electromagnetic radiation having the predetermined wavelength incident thereupon at a third cone angle of incidence, wherein the first cone angle of incidence, the second cone angle of incidence and the third cone angle of incidence are different.

13. A visor or a windshield comprising the optical filter according to claim 1.

14. A method of manufacturing the visor or the windshield according to claim 13, the method comprising:
providing the first layer comprising the first notch filter arranged to attenuate electromagnetic radiation having the first wavelength;
providing the second layer comprising the second notch filter arranged to attenuate electromagnetic radiation having the second wavelength;
stacking the second layer above the first layer, thereby forming the optical filter; and
applying the first layer to the visor or the windshield.

15. The method according to claim 14, wherein stacking the second layer above the first layer includes stacking the second layer directly upon the first layer.

16. An optical filter for a visor, the optical filter comprising:
a first layer comprising a first notch filter arranged to attenuate electromagnetic radiation having a first wavelength, incident normally thereupon; and
a second layer comprising a second notch filter arranged to attenuate electromagnetic radiation having a second wavelength, incident normally thereupon, wherein the first wavelength and the second wavelength are different, and wherein the first wavelength range or the second wavelength range is at most 20 nm;
wherein the second layer is stacked above the first layer; and
whereby, in use, the first notch filter attenuates electromagnetic radiation having a predetermined wavelength incident thereupon at a first cone angle of incidence, and the second notch filter attenuates the electromagnetic radiation having the predetermined wavelength incident thereupon at a second cone angle of incidence, wherein the first cone angle of incidence is within the second cone angle of incidence, and wherein the second cone angle of incidence is larger than the first cone angle of incidence.

17. The optical filter according to claim 16, wherein the first wavelength range or the second wavelength range is at most 10 nm.

18. An optical filter for a visor, the optical filter comprising:
a first layer comprising a first notch filter arranged to attenuate electromagnetic radiation having a first wavelength, incident normally thereupon; and
a second layer comprising a second notch filter arranged to attenuate electromagnetic radiation having a second wavelength, incident normally thereupon, wherein the first wavelength and the second wavelength are different, and wherein a difference between the first wavelength and the second wavelength is in a range from 1 nm to 100 nm;
wherein the second layer is stacked above the first layer; and
whereby, in use, the first notch filter attenuates electromagnetic radiation having a predetermined wavelength incident thereupon at a first cone angle of incidence, and the second notch filter attenuates the electromagnetic radiation having the predetermined wavelength incident thereupon at a second cone angle of incidence, wherein the first cone angle of incidence is within the second cone angle of incidence, and wherein the second cone angle of incidence is larger than the first cone angle of incidence.

19. The optical filter according to claim 18, wherein the first wavelength, the second wavelength, or the predetermined wavelength is in a range from 380 nm to 1100 nm.

* * * * *